US008203607B2

(12) United States Patent
Sabuncu et al.

(10) Patent No.: US 8,203,607 B2
(45) Date of Patent: Jun. 19, 2012

(54) INCORPORATING PRIOR INFORMATION FROM PRE ALIGNED IMAGE PAIRS INTO EMST-BASED IMAGE REGISTRATION

(75) Inventors: Mert Rory Sabuncu, Princeton, NJ (US); Christophe Chefd'hotel, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1723 days.

(21) Appl. No.: 11/422,408

(22) Filed: Jun. 6, 2006

(65) Prior Publication Data

US 2007/0086677 A1 Apr. 19, 2007

Related U.S. Application Data

(60) Provisional application No. 60/692,725, filed on Jun. 22, 2005.

(51) Int. Cl.
*H04N 7/12* (2006.01)
(52) U.S. Cl. ............ 348/135; 348/61; 348/77; 348/139; 348/140; 348/142
(58) Field of Classification Search ............. 348/61, 348/77, 135, 139, 140, 142
See application file for complete search history.

(56) References Cited

OTHER PUBLICATIONS

Leventon, M.E., et al., Grimson Multi Modal Volume Registration Using Joint Intensity Distribution, Proc. of MICCAI 98, Berlin Heidelberg 1998.
Chung, A.C.S., "Multi Modal Image Registration by Minimising Kullback Leibler Distance," Proc. of MICCAI 02, Berlin Heidelberg, 2002.
Sabuncu, M.R. et al. "Gradient Based Nonuniform Sampling for information Theoretic Alignment Methods," Proc. of 26th International Conference of the IEEE Engineering in Medicine and Biology Society, San Francisco, California Sep. 1-5, 2004.
Sabuncu, M. R. et al., "Gradient Based Optimization of an EMST Image Registration Function," Proc. of IEEE Conference on Acoustics, Speech and Signal Processing, Philadelphia, Mar. 2005.

*Primary Examiner* — Sath V Perungavoor
*Assistant Examiner* — Geepy Pe

(57) ABSTRACT

A computer-implemented method for automatic image registration includes providing a previously aligned image pair, extracting a first number of samples of features from the previously aligned image pair, and extracting a second number of samples of features from an observed image pair. The method further includes determining a Euclidean minimum spanning tree of a union set of the samples of features from the previously aligned image pair and the observed image pair, determining a similarity measure of the observed image pair based on the Euclidean minimum spanning tree, estimating a gradient of the similarity measure, wherein a gradient estimate is used to update transformation parameters applied to register the observed image pair, and outputting a registration of the observed image pair, wherein the registration of the observed image pair is one of displayed and stored on a storage media.

9 Claims, 4 Drawing Sheets

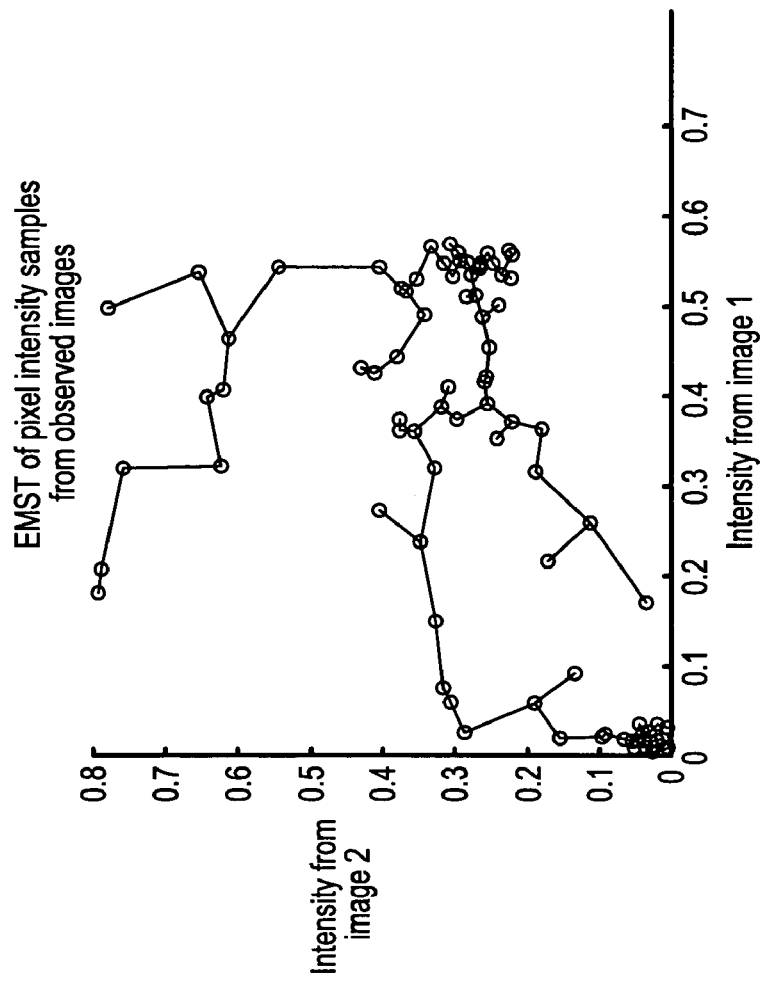
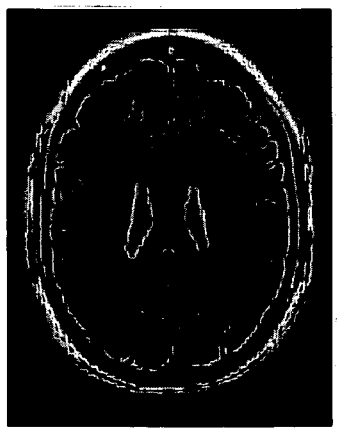
FIG. 1A
T1-weighted MRI
Image 1
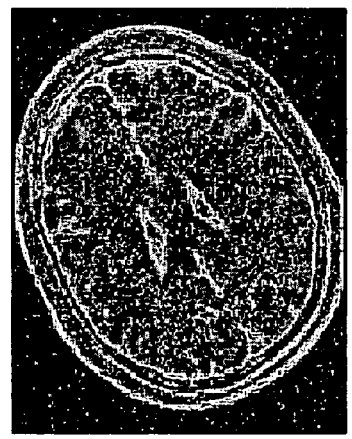
FIG. 1B
T2-weighted MRI
Image 2
FIG. 1C

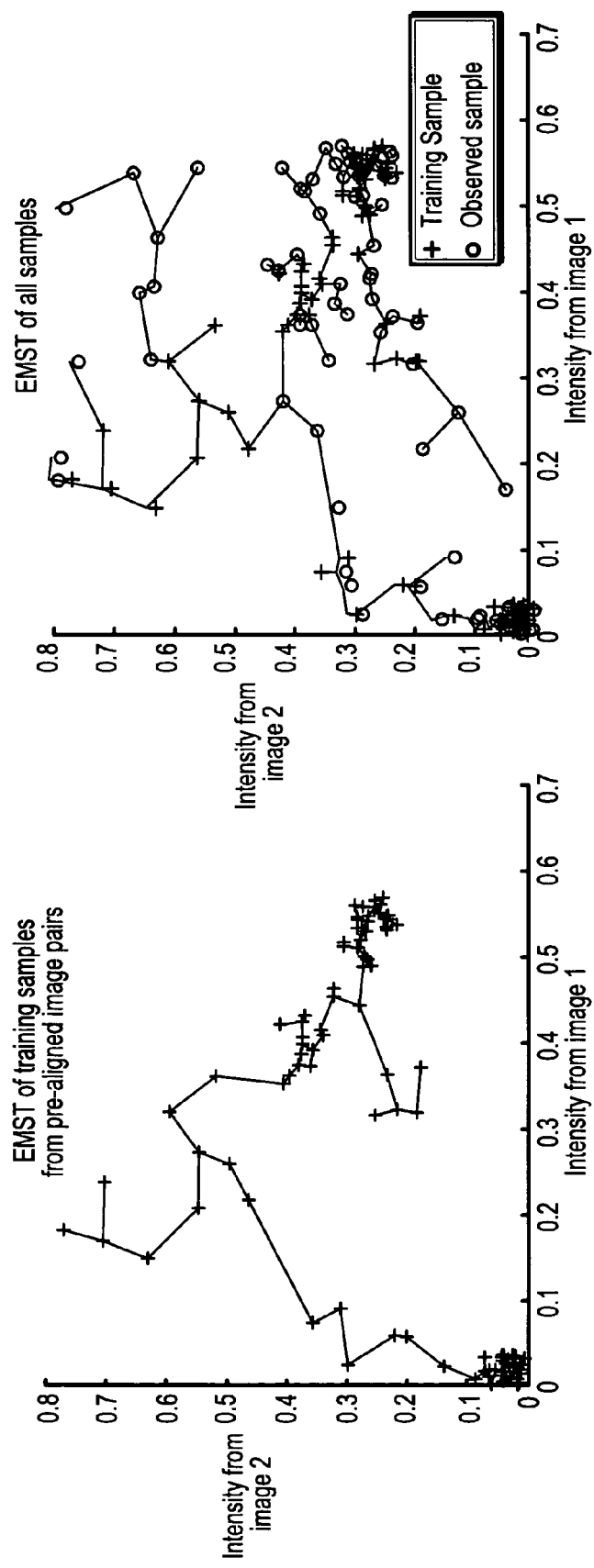

INCORPORATING PRIOR INFORMATION FROM PRE ALIGNED IMAGE PAIRS INTO EMST-BASED IMAGE REGISTRATION

CROSS-REFERENCE TO RELATED APPLICATIONS

This application claims the benefit of Provisional Application No. 60/692,725 filed on Jun. 22, 2005 in the United States Patent and Trademark Office, the contents of which are herein incorporated by reference in its entirety.

BACKGROUND OF THE INVENTION

1. Field of the Invention

The present disclosure relates to image processing, and more particularly to a system and method for automatic image registration using prior information from pre-aligned image pairs.

2. Description of Related Art

A typical image registration algorithm has three components; a registration measure that quantifies a similarity between two images; a transformation space that determines allowed spatial transformations; and an optimization scheme to search the allowed spatial transformations for a transformation that maximizes (or minimizes) the registration measure.

The problem of using prior information to improve multi-modal registration performance has been suggested by Leventon et al. They propose estimating the underlying joint prior intensity distribution of registered image pairs using training data and employing a maximum likelihood approach to define the registration measure for new image pairs. Subsequently, Chung et al., proposed an alternative approach in which the quality of registration is determined by a Kullback-Leibler divergence between the estimated joint intensity distribution of pre-aligned data and the joint intensity distribution of the new images. Registration is then accomplished by minimizing this K-L divergence. Both Leventon and Chung have indicated experimentally that using prior information improves the robustness of registration methods.

SUMMARY OF THE INVENTION

According to an embodiment of the present disclosure, a computer-implemented method for automatic image registration includes providing a previously aligned image pair, extracting a first number of samples of features from the previously aligned image pair, and extracting a second number of samples of features from an observed image pair. The method further includes determining a Euclidean minimum spanning tree (EMST) of a union set of the samples of features from the previously aligned image pair and the observed image pair, determining a similarity measure of the observed image pair based on the EMST, estimating a gradient of the similarity measure, wherein a gradient estimate is used to update transformation parameters applied to register the observed image pair, and outputting a registration of the observed image pair, wherein the registration of the observed image pair is one of displayed and stored on a storage media.

The previously aligned image pair is one of an image pair earlier in a sequence of registration problems and a training image pair.

The gradient of the similarity measure is estimated using a sum of gradients of power weighted edge lengths of the Euclidean minimum spanning tree.

The second predetermined number of samples of features are periodically extracted.

The registration of the observed image pair is determined as:

$$Q_\alpha(I_1, I_2) = J_{\alpha,w}(p_1, p_o) + \lambda^* H_\alpha(p_o),$$

where $$J_{\alpha,w}(p_1, p_o)$$

is an alpha-Jensen distance, and $$\lambda = |I^p|/(|I^t| + |I^o|)$$

is a weight that determines a relative influence of the term $H_\alpha(p_o)$ and $w = 1 - \lambda$.

The first and second number of samples of features are one of a same and different number of samples.

According to an embodiment of the present disclosure, a program storage device is provided readable by machine, tangibly embodying a program of instructions executable by the machine to perform method steps for automatic image registration. The method steps including providing a previously aligned image pair, extracting a first number of samples of features from the previously aligned image pair, and extracting a second number of the samples of features from an observed image pair. The method further includes determining an EMST of a union set of the samples of features from the previously aligned image pair and the observed image pair, determining a similarity measure of the observed image pair based on the EMST, estimating a gradient of the similarity measure, wherein a gradient estimate is used to update transformation parameters applied to register the observed image pair, and outputting a registration of the observed image pair.

BRIEF DESCRIPTION OF THE DRAWINGS

Preferred embodiments of the present invention will be described below in more detail, with reference to the accompanying drawings:

FIGS. 1A and 1B are T1 and T2-weighted MRI images, respectively;

FIG. 1C is an EMST (FIG. 1C) determined over the intensity samples from the joint image of FIGS. 1A and 1B according to an embodiment of the present disclosure;

FIG. 2A is an EMST of training sets of samples according to an embodiment of the present disclosure;

FIG. 2B is an EMST of union sets of sample according to an embodiment of the present disclosure;

DETAILED DESCRIPTION OF PREFERRED EMBODIMENTS

Figure 3:
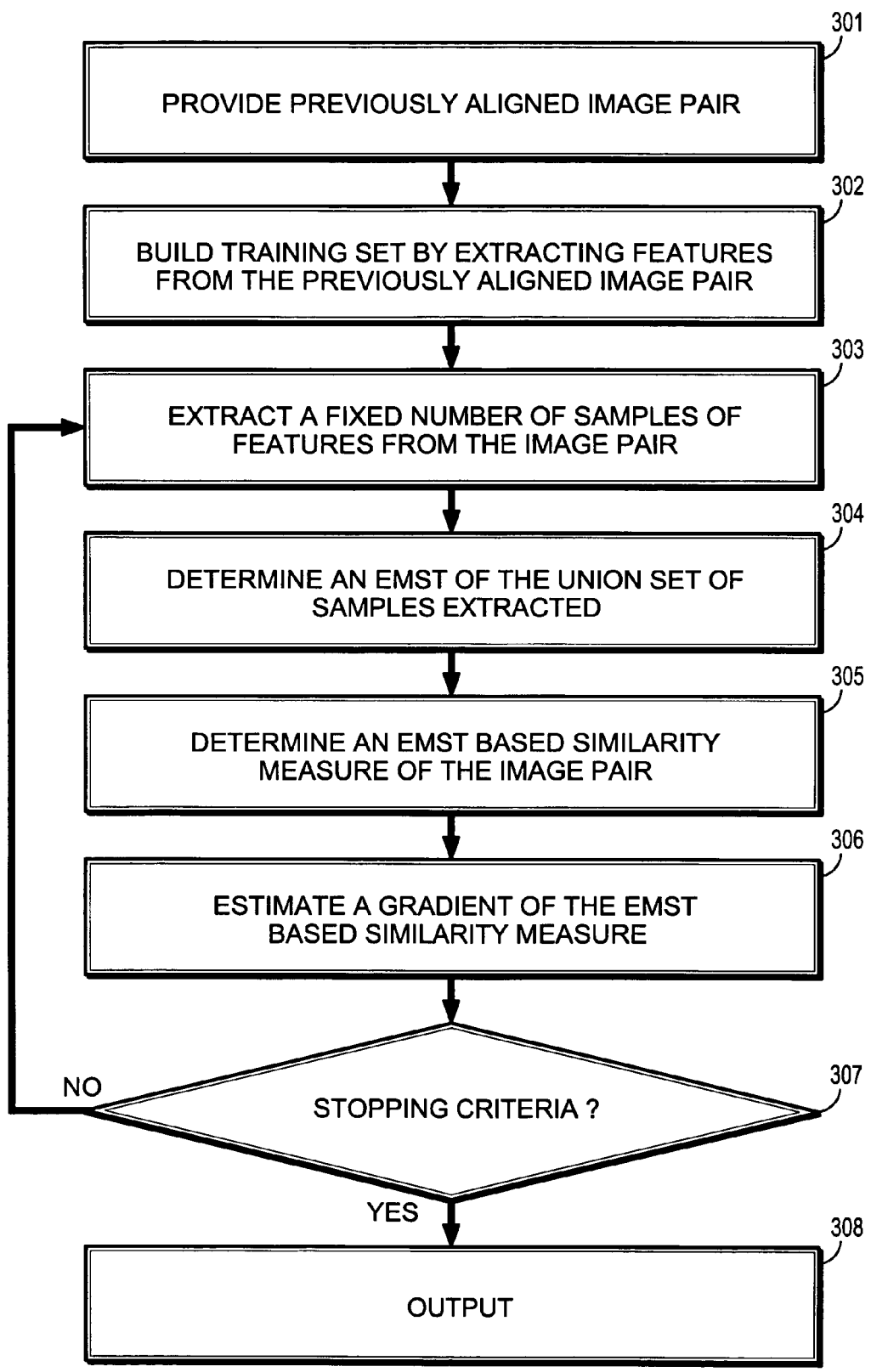
FIG. 3 is a flow chart of a method according to an embodiment of the present disclosure.

According to an embodiment of the present disclosure, a system and method employ information from previously aligned image pairs to improve the performance of an automatic image registration (e.g., spatial alignment) method, for example, in the registration and fusion of multi-modal medical data-sets (e.g., 2D and 3D, inter- and intra patient data).

According to an embodiment of the present disclosure, a method utilizes two distinct entropic measures: alpha-Renyi entropy and alpha-Jensen divergence. The alpha-Renyi entropy measure aims to quantify the alignment quality blindly, based solely on the image pair to be aligned. The alpha-Jensen divergence is used to incorporate prior information from a training set of correctly aligned image pairs. The qualities of the two approaches are incorporated into the method by introducing a hybrid measure.

According to an embodiment of the present disclosure, an EMST based estimate of the hybrid measure is employed to quantify the quality of alignment. The EMST is a minimum spanning tree of a set of points in a plane, wherein a weight of the edge between each pair of points is a distance between the points. The EMST based estimate of the hybrid measure can be applied to various classes of transformations, for example, on the rigid body transformation and describe potential extensions to richer classes of transformations, e.g., free-form deformations, non-linear parametric transformation models (thin-plates, B-splines), etc.

According to an embodiment of the present disclosure, in an EMST based image registration approach the registration measure is determined in the following manner. A list of feature pair values (scalars, e.g., pixel intensity values, or vectors, e.g., wavelet coefficients, gradients) are extracted from the image pair to be aligned. The sum of the power weighted Euclidean lengths of edges in an EMST of the feature list defines the registration measure, as illustrated in FIGS. 1A-C. FIGS. 1A and 1B are images to be aligned and the EMST (FIG. 1C) is determined over the intensity samples from the joint image. Total (power weighted) edge length of this EMST is a measure of the quality of alignment. The method is mathematically equivalent to employing the alpha-Renyi entropy ($H_\alpha(.)$) of the image pair under the assumption that each feature is an independent realization of an identically distributed random variable. Note that it can be argued that the alpha-Renyi entropy is a measure of statistical dependency between the two images. Since the registration measure employs only the information from the image pair to be aligned and ignores any potential prior information from previously aligned image pairs, it is referred to herein as a blind registration measure.

According to an embodiment of the present disclosure, prior information is implemented in an EMST registration measure. Consider a situation where a sequence of multi-modal image pairs $(I_1^k, I_2^k)$, k=0, 1, 2, . . . is to be registered. At time k−1 the image pairs $(I_1^j, I_2^j)$ for j=0, . . . , k−1 have been registered. If the spatial alignment of two distinct pairs is independent, then prior spatial alignments do not convey direct information about the alignment of $I_1^k$ and $I_2^k$. However, the modality relationship is assumed to be invariant along the sequence and hence information about the modality relationship gained from the prior alignments is potentially useful in the registration of the image pair $(I_1^k, I_2^k)$.

According to an embodiment of the present disclosure, the use of prior information is incorporated into an EMST based image registration framework and a registration measure incorporates information from previously aligned image pairs. These may be image pairs earlier in a sequence of registration problems or may come from a set of training examples. In either case, as the quality of the prior information improves, the prior information is used in a weighted fashion to improve the accuracy of new registrations between the same modalities.

According to an embodiment of the present disclosure, the alpha-Jensen distance is used to measure the quality of alignment based on the discrepancy between the observed distribution and a prior distribution. The alpha-Jensen distance is a distance measure between probability distributions defined using the Renyi entropy. For a fixed $\alpha \in (0,1)$, $w \in (0,1)$ the alpha-Jensen distance from $p_x$ to $p_y$ is:

$$J_{\alpha,w}(p_x,p_y)=H_\alpha(wp_x+(1-w)p_y)-[wH_\alpha(p_x)+(1-w)H_\alpha(p_y)].$$

Since $H\alpha$ is concave, $J_{\alpha,w}(p_x,p_y)>0$ when $p_x \neq p_y$ and $J_{\alpha,w}(p_x,p_y)=0$ when $p_x=p_y$ where $p_x$ or $p_y$ are not equal to zero. The performance of a registration measure based on the Jensen distance will depend on the quality and amount of the prior information. On the other hand, the Renyi entropy measure ignores this potentially useful information. According to an embodiment of the present disclosure, these two measures are combined in a hybrid registration measure in the following manner. Let $I^r$ and $I^o$ denote the set of feature samples from the training set $I^r$ and observed image pair $I^o$, respectively and $p_r$ and $p_o$ designate the corresponding distributions. Then define the hybrid measure by:

$$Q_\alpha(I_1,I_2)=J_{\alpha,w}(p_r,p_o)+\lambda^* H_\alpha(p_o), \quad (1)$$

where $$\lambda=|I^o|/(|I^r|+|I^o|) \quad (2)$$

is the weight that determines the relative influence of the Renyl entropy term and w=1−λ. Note that |.| denotes set cardinality.

Based on an EMST estimate of this measure, the total power weighted edge length of the EMST determined on the union set, including training samples plus observed samples, is implemented as a registration measure (see FIGS. 2A and 2B).

FIGS. 2A and 2B shown EMSTs of the training and union sets of samples, respectively. Total (power weighted) edge length of the EMST on the right is a measure of the quality of the alignment of the observed images. This measure incorporates prior information from pre-aligned image pairs.

Referring to FIG. 3, in the following description the parameter space is defined as a rigid body transformation parameterized by rotation angles and a translation vector. Previously aligned image pairs are provided 301.

A training set is built by extracting samples of features from the previously aligned image pairs 302. The types of features include, but are not limited to, pixel intensity values, intensity gradient, and wavelet coefficients. The EMST is determined based on this set. The edges not included in this EMST will be referred to as redundant edges.

A fixed number of samples of features are extracted from the observed image pair 303. The types of features include, but are not limited to, pixel intensity values, intensity gradient, and wavelet coefficients. A non-uniform sub-sampling technique can be applied to improve accuracy and speed.

The EMST of the union set of samples is determined using Kruskal's algorithm or other existing techniques 304. Delaunay triangulation, applied prior to this can be used to speed the EMST method. Moreover, redundant edges can be discarded when determining this EMST. An alternative method used for high dimensional features is to run the Delaunay triangulation on a reduced dimensional space (e.g., obtained by projection) and the EMST of this triangulation can be determined in the original space. This gives an approximate EMST of the samples living in a high dimensional space.

A similarity measure based on the EMST is determined 305. The similarity measure includes an indication of a quality of the registration and of a gradient of the transformation parameters, e.g., how to change the transformation parameters to improve the registration.

Since the extracted samples are quantized, the total (power weighted) length of EMST is not differentiable with respect to the transformation parameters. Assuming that the topology of the EMST remains constant for a fixed positive number $k \in Z^+$ of iterations, an estimate of the gradient of an EMST metric, the similarity measure, is determined as the sum of the gradients of the weighted edge lengths 306. The gradient estimate is used to update transformation parameters of an optimization for registering the observed image pair. Every k iterations the method returns to block 303.

The optimization can be an implementation of an iterative gradient-descent of a variant thereof. The method can be combined with a multi-resolution and multi-start optimization to prevent being trapped into local extrema. For example, starting with registering coarse (low resolution) representations of the observed images. Gaussian blurring and uniform sub-sampling may be used to obtain these low-resolution images. The registration results obtained from the coarse level are used to initialize the registration at the next level.

The method terminates once a stopping criteria is satisfied 307, e.g., if the change in parameter values over the last X iterations has not exceeded a predetermined threshold, where X is some predetermined number of iterations. A registered image pair is output 308, for example, to a display for viewing or to a storage media.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
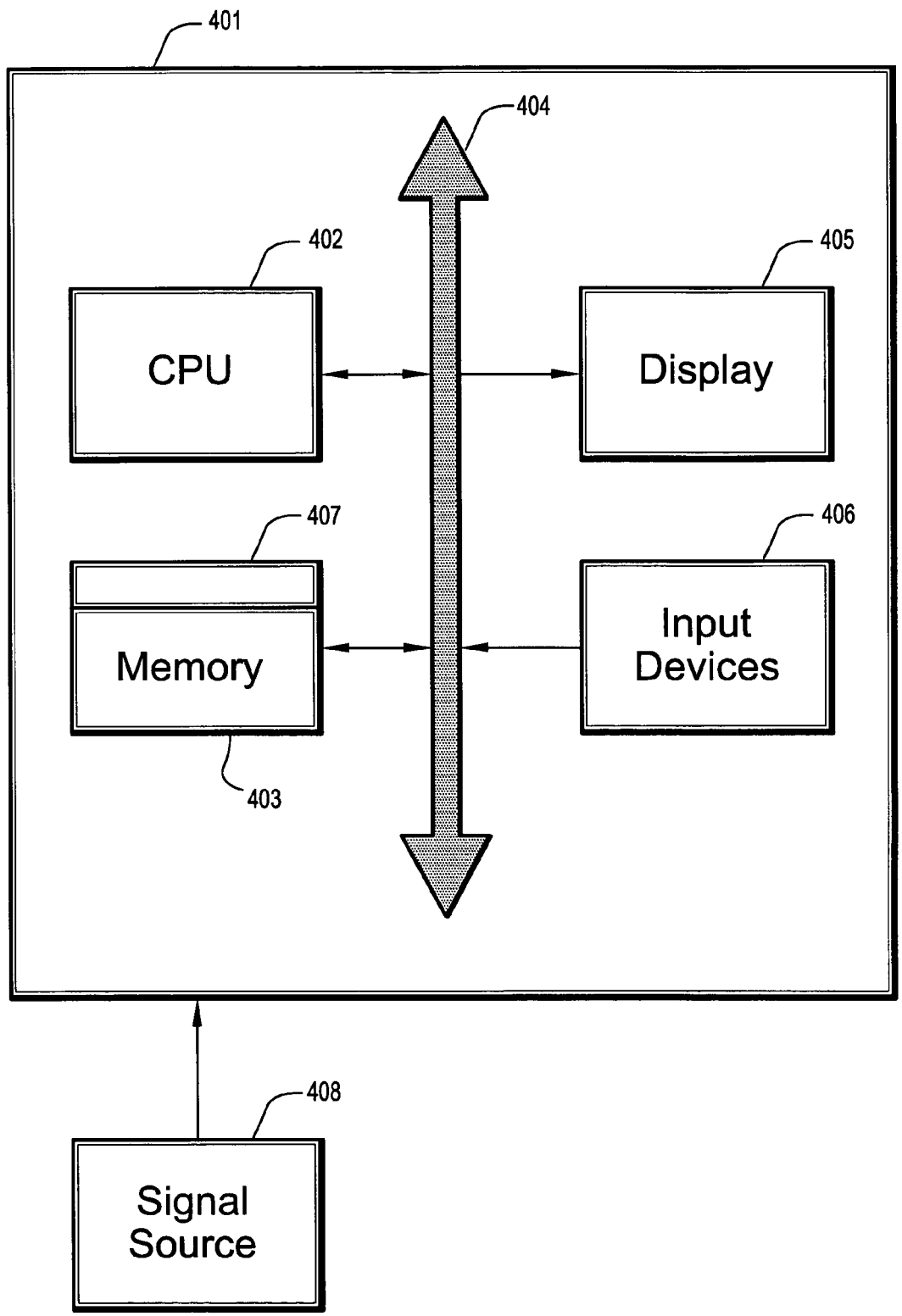
FIG. 4 is a diagram of a system according to an embodiment of the present disclosure.

Referring to FIG. 4, according to an embodiment of the present disclosure, a computer system 401 for automatic image registration can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 1007 that is stored in memory 403 and executed by the CPU 402 to process the signal from the signal source 408. As such, the computer system 401 is a general-purpose computer system that becomes a specific purpose computer system when executing the routine 407 of the present invention.

The computer platform 401 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for automatic image registration, it is noted that s modifications and variations can be made by persons skilled in the art in light of the above teachings. It is therefore to be understood that changes may be made in embodiments of the present disclosure that are within the scope and spirit thereof.

What is claimed is:

1. A program storage device readable by machine, tangibly embodying a program of instructions executable by the machine to perform method steps for automatic image registration, the method steps comprising:
   providing a previously aligned image pair;
   extracting a first number samples of features from the previously aligned image pair;
   extracting a second number of the samples of features from an observed image pair, each of the observed image pair being different from any of the previously aligned image pair;
   determining a Euclidean minimum spanning tree of a union set of the samples of features from the previously aligned image pair and the observed image pair;
   determining a similarity measure of the observed image pair based on the Euclidean minimum spanning tree;
   estimating a gradient of the similarity measure, wherein a gradient estimate is used to update transformation parameters applied to register the observed image pair; and
   outputting a registration of the observed image pair.

2. The method of claim 1, wherein the previously aligned image pair is one of an image pair earlier in a sequence of registration problems and a training image pair.

3. The method of claim 1, wherein the gradient of the similarity measure is estimated using a sum of gradients of power weighted edge lengths of the Euclidean minimum spanning tree.

4. The method of claim 1, wherein the second number of samples of features is periodically extracted.

5. The computer-implemented method of claim 1, wherein the registration of the observed image pair is determined as:

$$Q_\alpha(I_1,I_2)=J_{\alpha,w}(p_t,p_o)+\lambda^* H_\alpha(p_o),$$

where $$J_{\alpha,w}(p_t,p_o)$$

is an alpha-Jensen distance, and $$\lambda=|I^o|/(|I^t|+|I^o|)$$

is a weight that determines a relative influence of the term $H_\alpha(p_o)$ and w =1−λ.

6. The method of claim 1, wherein the first and second number of samples are one of a same and different number of samples.

7. A program storage device readable by machine, tangibly embodying a program of instructions executable by the machine to perform method steps for automatic image registration, the method steps comprising:
   providing a previously aligned image pair;
   extracting a first number samples of features from the previously aligned image pair;
   extracting a second number of the samples of features from an observed image pair, each of the observed image pair being different from any of the previously aligned image pair;
   determining a Euclidean minimum spanning tree of a union set of the samples of features from the previously aligned image pair and the observed image pair;
   determining a similarity measure of the observed image pair based on the Euclidean minimum spanning tree;
   estimating a gradient of the similarity measure, wherein a gradient estimate updates a transformation parameter applied to register the observed image pair, wherein the gradient of the similarity measure is estimated using a sum of gradients of power weighted edge lengths of the Euclidean minimum spanning tree of the union set, including the previously aligned image pair and the observed image pair; and outputting a registration of the observed image pair determined by an updated transformation parameter.

8. The method of claim 1, wherein the previously aligned image pair is one of an image pair earlier in a sequence of registration problems and a training image pair.

9. The method of claim 1, wherein the second number of samples of features is periodically extracted.

* * * * *